United States Patent [19]

Swarden et al.

[11] Patent Number: 5,014,421
[45] Date of Patent: May 14, 1991

[54] CONTOURED BLADE EDGE CUTTING METHOD

[75] Inventors: M. C. Swarden, Cambridge; W. Jansen, Weston; John M. Griffith, Lexington, all of Mass.

[73] Assignee: Ingersoll-Rand Company, Woodcliff Lake, N.J.

[21] Appl. No.: 457,225

[22] Filed: Dec. 26, 1989

[51] Int. Cl.$^5$ .............................................. B21K 3/04
[52] U.S. Cl. .................................. 29/889.7; 409/131; 409/199; 83/53; 219/69.17; 204/129.1
[58] Field of Search .................... 409/131, 132, 199; 83/53, 177, 428; 51/281 R, 326; 219/69.17, 69.2, 69.11, 69.15; 29/557, 558, 889.6, 889.7, 890.142, 890.143, 889.23; 204/129.43, 129.1

[56] References Cited

U.S. PATENT DOCUMENTS

| | | | |
|---|---|---|---|
| 2,480,807 | 8/1949 | De Vlieg | 29/889.23 X |
| 2,633,776 | 4/1953 | Schenk | 29/889.23 |
| 3,295,190 | 1/1967 | Parsons | 409/131 X |
| 4,467,166 | 8/1984 | Gamo et al. | 219/69.17 X |
| 4,518,842 | 5/1985 | Obara | 219/69.12 X |
| 4,644,124 | 2/1987 | Hori et al. | 219/69.17 |
| 4,843,203 | 6/1989 | Gamo et al. | 219/69.17 X |
| 4,852,232 | 8/1989 | Wells | 29/558 X |
| 4,888,863 | 12/1989 | Cox et al. | 219/69.11 X |

OTHER PUBLICATIONS

NASA Tech. Briefs, p. 71, Nov. 1989.
NREC Newsletter, Fall 1989, vol. 3, Issue No. 2.
NREC Newsletter, Winter 1990, vol. 4, Issue No. 1.
Manufacturing Engineering Article, Frank Hines, pp. 88 and 89, May 1989.

*Primary Examiner*—Larry I. Schwartz
*Assistant Examiner*—R. Schultz
*Attorney, Agent, or Firm*—Glenn B. Foster

[57] ABSTRACT

A blade having a concavely shaped leading edge is cut. The blade has first and second side faces, a tip profile and a root profile. Each profile has a first and second profile side corresponding with the first and second side faces. The cutter is positioned between the first root profile side and the first tip profile side. The tip profile and root profile are followed with two cutter portions of the cutter along the first root and tip profile sides toward the leading edge to cut the first side face. One of the cutter portions is translated around to the second profile side before the other cutter portion is translated to the second profile side, causing the formation of the concave leading edge. The tip and root profile is followed with the cutter, along the second profile side away from the leading edge to cut the second side face.

6 Claims, 3 Drawing Sheets

CONTOURED BLADE EDGE CUTTING METHOD

BACKGROUND OF THE INVENTION

This invention relates generally to turbo machinery blade cutters, and more particularly to a method of cutting curved blade surfaces with a cutter.

Presently, point millers are used to shape blades having complex shapes. However, point millers do not leave a smooth surface after machining. Also, the point milling process requires a greater cutting time to machine the same piece than flank milling does.

The foregoing illustrates limitations known to exist in present devices and methods Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a blade cutting method for a blade having a concavely shaped edge, first and second side faces, a tip profile and a root profile. Each profile has a first and second profile side corresponding with the first and second side faces.

The cutting apparatus is positioned between the first root profile side and the first tip profile side. The tip profile and root profile are followed with two cutter portions of the cutting apparatus along the first root and tip profile sides toward the leading edge to cut the first side face. One of the cutter portions is translated around to the second profile side before the other cutter portion is translated to the second profile side, causing the formation of the concave edge. The tip and root profile is followed with the cutting apparatus, along the second profile side, away from the leading edge to cut the second side face.

The foregoing and other aspects will become apparent from the following detailed description of the invention when considered in conjunction with the accompanying drawing. It is to be expressly understood, however, that the drawing figures are not intended as a definition of the invention, but are for the purpose of illustration only.

DETAILED DESCRIPTION

Figure 1:
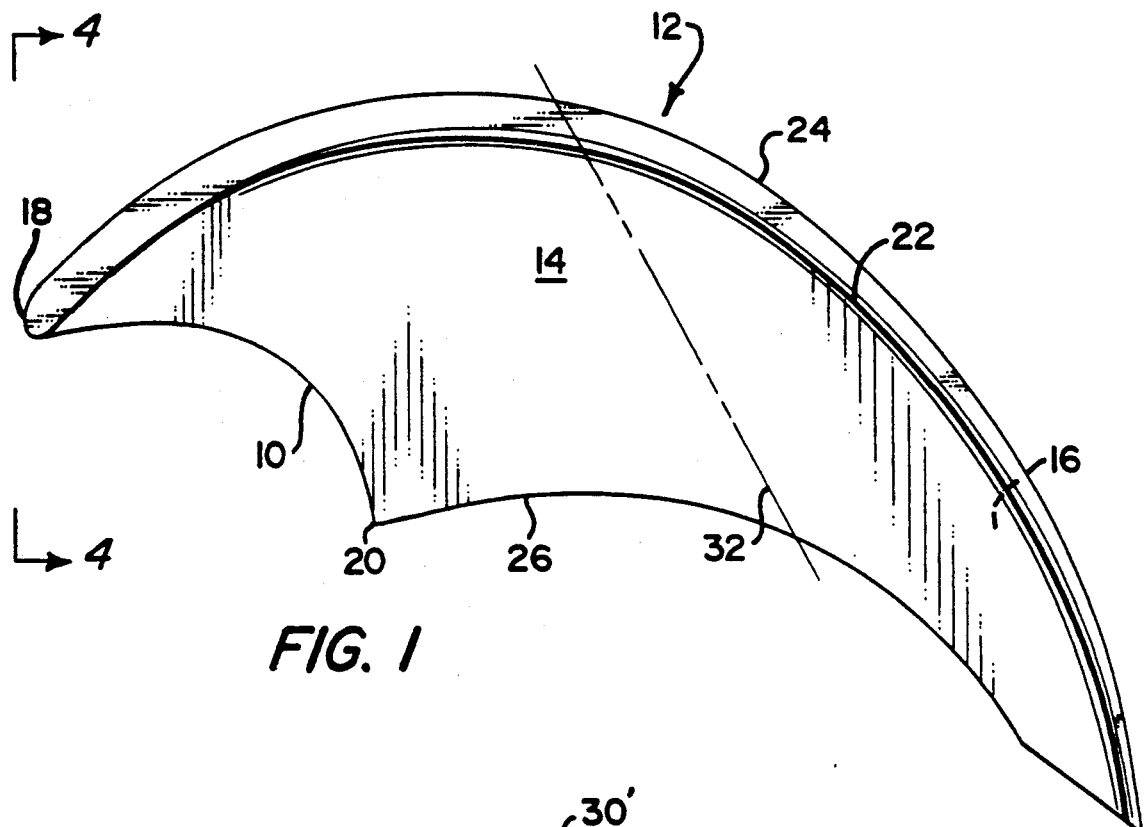
FIG. 1 is a perspective view of one embodiment of a formed turbo machinery blade with a concave edges, especially leading edges, such as is formed by the method of the instant invention.
Figure 2:
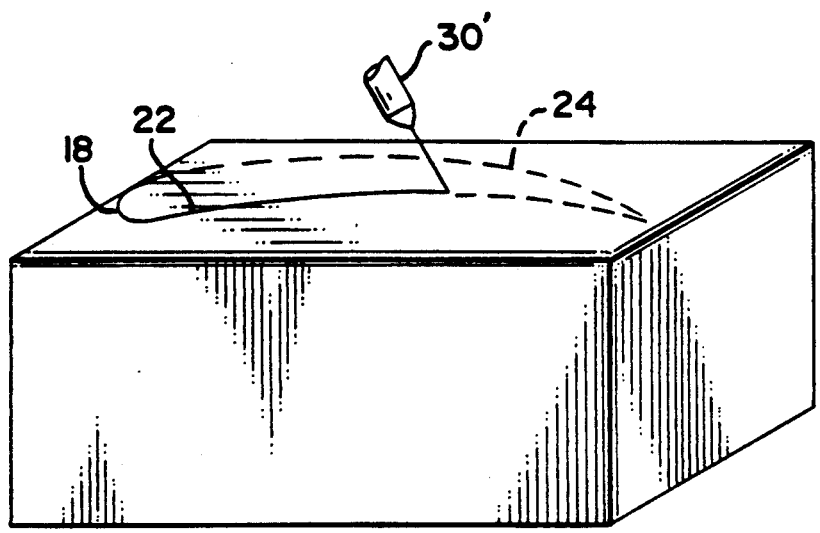
FIG. 2 illustrates one method of cutting the blade of the instant invention from a solid work piece, utilizing a waterjet cutter.
Figure 4:
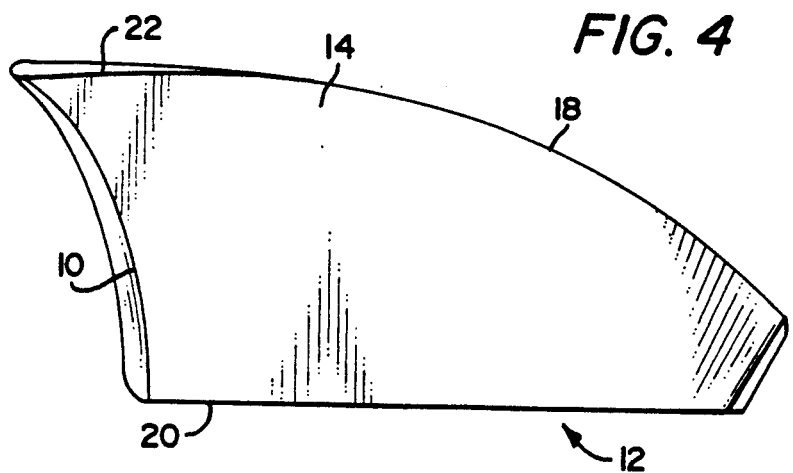
FIG. 4 illustrates a left elevational view of the blade as taken along lines 4—4 in FIG. 1.
Figure 3:
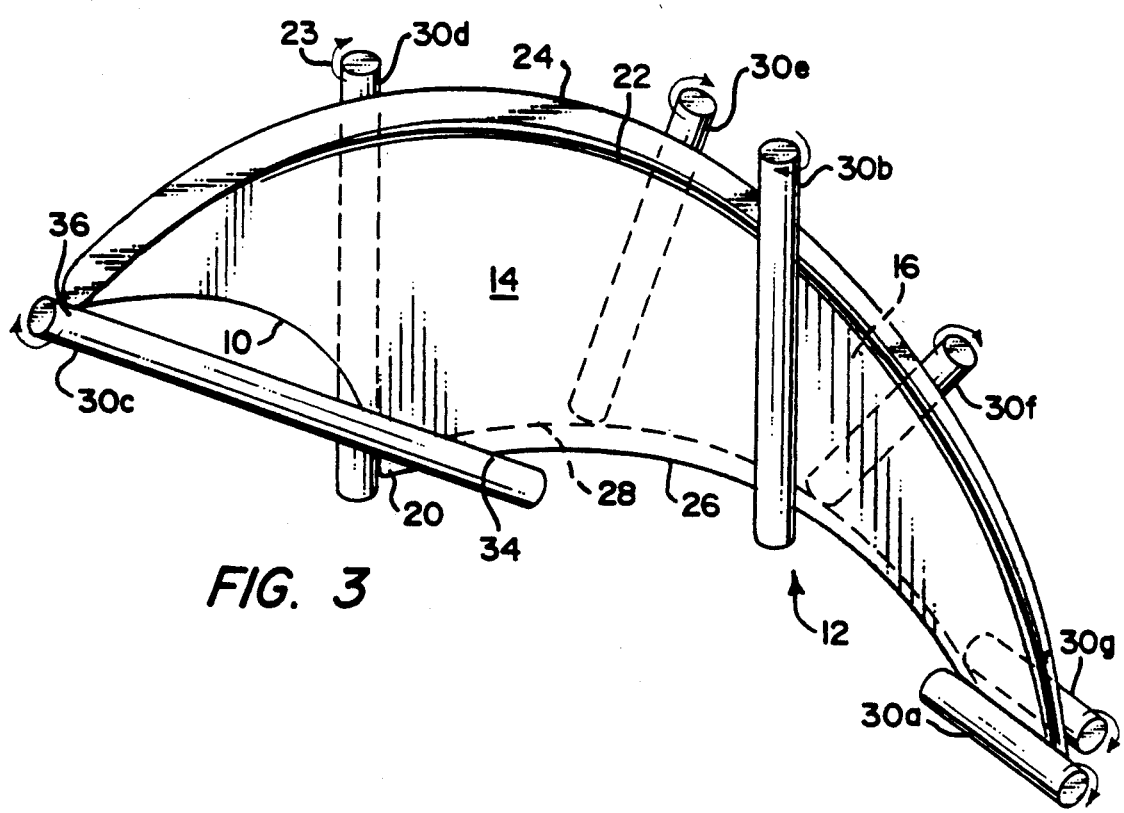
FIG. 3 illustrates another method of cutting the blade illustrating several periodic positions which a cutter assumes, with respect to the turbo machine blade, when forming the blade.
Figure 5A:
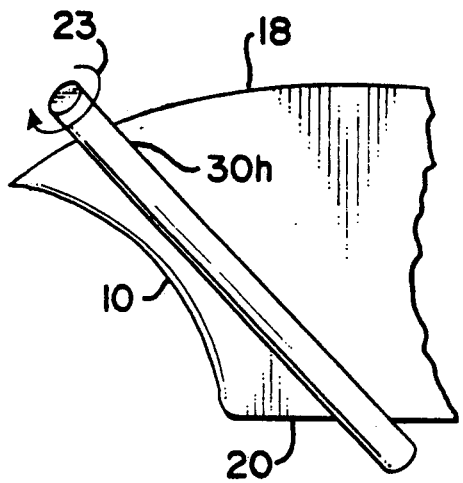
FIGS. 5a, 5b and 5c illustrate the relative positions which the cutter takes with respect to the blade when the cutter is forming the concave leading edge of the blade.
Figure 5B:
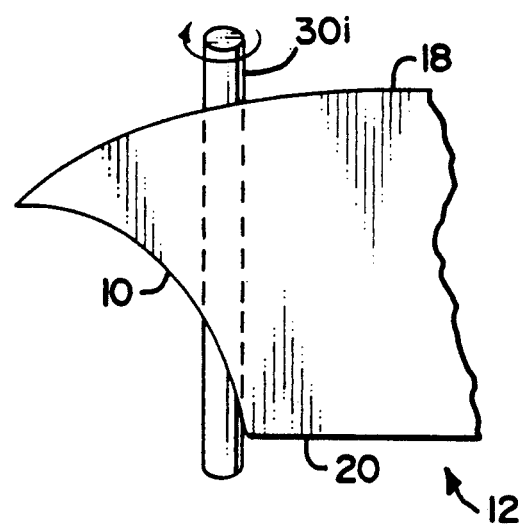
Figure 5C:
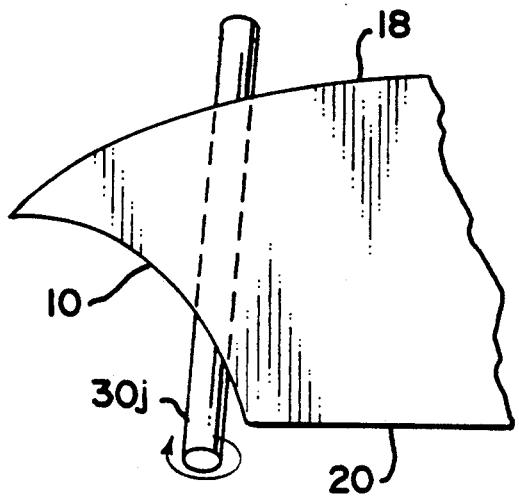

Pumps experiencing cavitation produce more noise than normally operating pumps. In situations where pump noise is critical, such as in submarines, it is therefore desirable to eliminate cavitation. One method presently used to eliminate cavitation is to provide concave edges, especially leading edges 10 on pump blades 12.

The blade 12 includes the leading edge 10, two side faces 14, 16, a tip profile 18 and a root profile 20. The tip profile 18 has a first and a second tip profile side 22, 24. The root profile 20 has a first and a second root profile side 26, 28.

The blade leading edge 10, as well as first and second side faces of the blade 14, 16 represent complex shapes. Therefore, these blades have traditionally been shaped by point milling. The purpose of the instant invention is to provide a method whereby a flank miller, or other cutter or cutting apparatus 30, may be used to cut the blade 12 which has a complex shape.

As the cutting apparatus continues around the blade 12, a different axial portion of the blade will contact the root and tip cutter portions, 34, 36 respectively. The cutter portion 34, 36 which contacts the root and the tip profile 20, 18 respectively, depends upon the thickness of the blade and the altitude of the cutting apparatus relative to the blade.

Any cutter 30 which cuts a surface with a single pass may be used in this application. Flank milling 30, electro discharge milling, electro chemical milling, waterjet 30' and other abrasive cutters are especially applicable to the instant invention. The advantages of these type of cutters over the repetitive pass cutters are smoother surfaces (which further reduce to probability of cavitation by smoothing the liquid flow over the blade faces 14,16 ), and simpler, shorter machining time.

At each point along the root profile 20 of the finished blade 12, there is a path 32 between the root profile and the tip profile which matches the side contour of the cutting apparatus 30. The cutter 30 usually, but not always, has a straight cutting edge. As the cutter 30 a-g follows the root profile, for each point 34 that the cutter encounters, the cutter is always oriented along the path 32 for that point. Note that the rate at which the cutter travels along the root and the tip profiles is not constant, and is not equivalent to the rate of travel along the other profile. If the cutter is of a milling type, it will rotate 23 at a constant rate about it's axis to cause the cutting action.

As the cutting apparatus 30h (during the forming of the first side face 14), approaches the leading edge 10, either a root cutter portion 34 which intersects the root profile 20 is closer to or farther from the leading edge than a tip cutter portion 36 which intersects the tip profile 18. Whichever cutter portion 34, 36 intersects the leading edge first will follow the second profile side 24, 28 while the lagging cutter portion will follow the first profile side 22, 26.

The process of one cutter portion 34 or 36 following the profile side on the first side of the blade while the other cutter portion follows the other profile side will result in the formation of the desired concave leading edge 10. As the cutter 30i continues around the concave leading edge, the cutter 30 will always be oriented along the path 32 for each point along the root profile 20 which the cutter encounters.

When the lagging cutter portion 34 or 36 passes the leading edge 10, both cutter portions will be following the second profile sides, and will travel away from the leading edge. The cutter 30j will be oriented along the path 32 between the profile sides 24, 28 on the second side face 16. Once again, the cutter portions 34, 36 will not be travelling at a constant rate, or at an identical speed as the other cutter portion.

While this invention has been illustrated and described in accordance with a preferred embodiment, it is recognized that variations and changes may be made therein without departing from the invention as set forth in the claims.

What is claimed is:

1. A method of cutting a blade having a concave edge, first and second side faces, a tip profile and a root profile, each profile having a first and second profile side corresponding with the first and second side faces utilizing a single cutting apparatus with a substantially linear cutting contour, including the steps of:

positioning the cutting apparatus between the first root profile side and the first tip profile side;

following the tip profile and root profile with two axially separate cutter portions of the cutting apparatus along the first root and tip profile sides towards the concave edge to cut at least a portion of the first side face each cutter portion is displaceable along an axial length of the cutting apparatus as each cutter portion follows its respective root profile;

translating one of the cutter portions around to the second profile side before the other cutter portion is translated to the second profile side, causing the formation of the concave edge; and following the tip and root profile with the cutting apparatus, along the second profile side, away from the concave edge to cut at least a portion of the second side face.

2. The method as defined in claim 1, wherein the cutting apparatus is a waterjet cutter.

3. The method as defined in claim 1, wherein the cutting apparatus is a flank milling cutter.

4. A method of cutting a blade with a single cutting apparatus, the blade having a concavely curved leading edge, first and second side faces, a tip profile and a root profile, each profile having a first and second profile side corresponding with the first and second side faces, for each point on the root profile, there is path between the root profile and the tip profile which matches a substantially linear cutting contour of the single cutting apparatus, including the steps of:

positioning a cutting apparatus between the first root profile side and the first tip profile side, oriented along the path for a root profile point;

following the tip profile and root profile with two axially separate cutter portions of the cutting apparatus along the first root and tip profile sides towards the concave edge to cut at least a portion of the first side face, maintaining the cutting apparatus along the path for each point along the root profile which the cutting apparatus encounters, each cutter portion is displaceable along an axial length of the cutting apparatus as each cutter portion follows its respective root profile;

translating one of the cutter portions around to the second profile side before the other cutter portion is translated to the second profile side, causing the formation of the concave edge, maintaining the cutting apparatus along the path; and following the tip and root profile with the cutting apparatus, along the second profile side, away from the concave edge to cut at least a portion of the second side face, maintaining the cutting apparatus oriented along the path.

5. The method as defined in claim 4, wherein the cutting apparatus is a waterjet cutter.

6. The method as defined in claim 4, wherein the cutting apparatus is a flank milling cutter.

* * * * *